US012669388B2

(12) United States Patent
Sato et al.

(10) Patent No.: US 12,669,388 B2
(45) Date of Patent: Jun. 30, 2026

(54) DETECTION DEVICE AND DOOR HANDLE HAVING LONGITUDINALLY DISPLACEABLE MEMBER

(71) Applicant: ALPS ALPINE CO., LTD., Tokyo (JP)

(72) Inventors: Wataru Sato, Miyagi (JP); Yuzuru Kawana, Miyagi (JP); Kazuhito Oshita, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 344 days.

(21) Appl. No.: 18/529,073

(22) Filed: Dec. 5, 2023

(65) Prior Publication Data

US 2024/0118147 A1 Apr. 11, 2024

Related U.S. Application Data

(63) Continuation of application No. PCT/JP2022/011203, filed on Mar. 14, 2022.

(30) Foreign Application Priority Data

Jul. 2, 2021 (JP) ................................ 2021-110981

(51) Int. Cl.
*G01L 1/16* (2006.01)
*E05B 81/76* (2014.01)

(52) U.S. Cl.
CPC ................ *G01L 1/16* (2013.01); *E05B 81/77* (2013.01)

(58) Field of Classification Search
CPC ......... G01L 1/18; G01L 1/2293; E05B 81/76; E05B 81/77
See application file for complete search history.

(56) References Cited

U.S. PATENT DOCUMENTS 7,105,943 B2 * 9/2006 Willats .................... E05B 85/12 70/277
7,654,147 B2 * 2/2010 Witte ...................... E05B 81/78 73/781

(Continued)

FOREIGN PATENT DOCUMENTS

JP 2016-130392 7/2016
WO 2021/044649 3/2021

OTHER PUBLICATIONS

International Search Report for PCT/JP2022/011203 mailed on May 17, 2022.

*Primary Examiner* — Tran M. Tran
(74) *Attorney, Agent, or Firm* — IPUSA, PLLC

(57) ABSTRACT

A detection device provided in an interior of a vehicle door handle including an inner casing includes a base portion, a displaceable member, and a sensor. The base portion has a longitudinal shape extending along a longitudinal direction of the door handle, is disposed fixedly to the inner casing, and is configured to deform in response to a pressure applied to the inner casing. The displaceable member has a longitudinal shape extending along the longitudinal direction of the door handle and is provided to face the base portion. Either or both of one end portion and the other end portion of the displaceable member are connected to the base portion. The displaceable member includes a displaceable portion configured to be displaced relatively to the base portion in accordance with deformation of the base portion. The sensor is configured to detect displacement of the displaceable portion.

8 Claims, 15 Drawing Sheets

(56) References Cited

U.S. PATENT DOCUMENTS

| | | | | |
|---|---|---|---|---|
| 8,575,506 | B2 * | 11/2013 | Kitahara | H01H 13/06 200/341 |
| 9,696,839 | B1 * | 7/2017 | Bingle | G06F 3/04883 |
| 10,001,418 | B1 * | 6/2018 | Machir | G01L 1/2231 |
| 10,969,895 | B2 * | 4/2021 | Sato | G06F 3/041 |
| 11,313,158 | B2 * | 4/2022 | Lu | E05B 81/77 |
| 11,402,236 | B2 * | 8/2022 | Vaysse | E05B 81/77 |
| 11,542,731 | B2 * | 1/2023 | Leonardi | G07C 5/008 |
| 11,692,378 | B2 * | 7/2023 | Yoshida | E05B 85/16 292/336.3 |
| 11,808,062 | B2 * | 11/2023 | Schatz | E05B 85/16 |
| 12,320,168 | B2 * | 6/2025 | Mensch | H03K 17/975 |
| 12,331,568 | B2 * | 6/2025 | Ichikawa | B60R 16/0215 |
| 12,404,705 | B2 * | 9/2025 | Ishii | E05B 81/77 |
| 12,485,946 | B2 * | 12/2025 | Summers | G01L 5/22 |
| 2008/0079537 | A1 * | 4/2008 | Touge | E05B 81/78 340/5.72 |
| 2010/0237635 | A1 * | 9/2010 | Ieda | E05B 81/78 292/336.3 |
| 2012/0006664 | A1 * | 1/2012 | Kitahara | H01H 13/06 200/341 |
| 2017/0213660 | A1 * | 7/2017 | Kitahara | H01H 9/04 |
| 2017/0260778 | A1 * | 9/2017 | Witte | G07C 9/00174 |
| 2020/0011096 | A1 | 1/2020 | Leonardi et al. | |
| 2022/0154498 | A1 | 5/2022 | Sato et al. | |
| 2024/0076912 | A1 * | 3/2024 | Akanou | G01L 1/2206 |

* cited by examiner 100-2

120(100A)

170(20)

171

173

130A

130(20)

142

140(20)

141

172

173

173

110(100A)

111B

111

111A 113A
113B ⎫ 113

112A
112B ⎫ 112

Z
Y
X

DETECTION DEVICE AND DOOR HANDLE HAVING LONGITUDINALLY DISPLACEABLE MEMBER

CROSS-REFERENCE TO RELATED APPLICATIONS

This application is a continuation application of International Application No. PCT/JP2022/011203, filed on Mar. 14, 2022, and designated the U.S., which is based upon and claims priority to Japanese Patent Application No. 2021-110981, filed on Jul. 2, 2021, the entire contents of which are incorporated herein by reference.

BACKGROUND

1. Field of the Invention

The present disclosure relates to detection devices and door handles.

2. Description of the Related Art

For example, Japanese Laid-Open Patent Publication No. 2016-130392 discloses a technique of locking or unlocking a vehicle door by a pressure sensor provided at a substrate in a door handle for a vehicle. In this technique, the pressure sensor detects deflection deformation of the substrate in the door handle upon application of a pressure to the door handle.

SUMMARY

A detection device according to one embodiment is a detection device provided in an interior of a vehicle door handle including an inner casing. The detection device includes a base portion, a displaceable member, and a sensor. The base portion has a longitudinal shape extending along a longitudinal direction of the door handle, is disposed fixedly to the inner casing, and is configured to deform in response to a pressure applied to the inner casing. The displaceable member has a longitudinal shape extending along the longitudinal direction of the door handle and is provided to face the base portion. Either or both of one end portion and the other end portion of the displaceable member are connected to the base portion. The displaceable member includes a displaceable portion configured to be displaced relatively to the base portion in accordance with deformation of the base portion. The sensor is configured to detect displacement of the displaceable portion.

DESCRIPTION OF THE EMBODIMENTS

Figure 1:
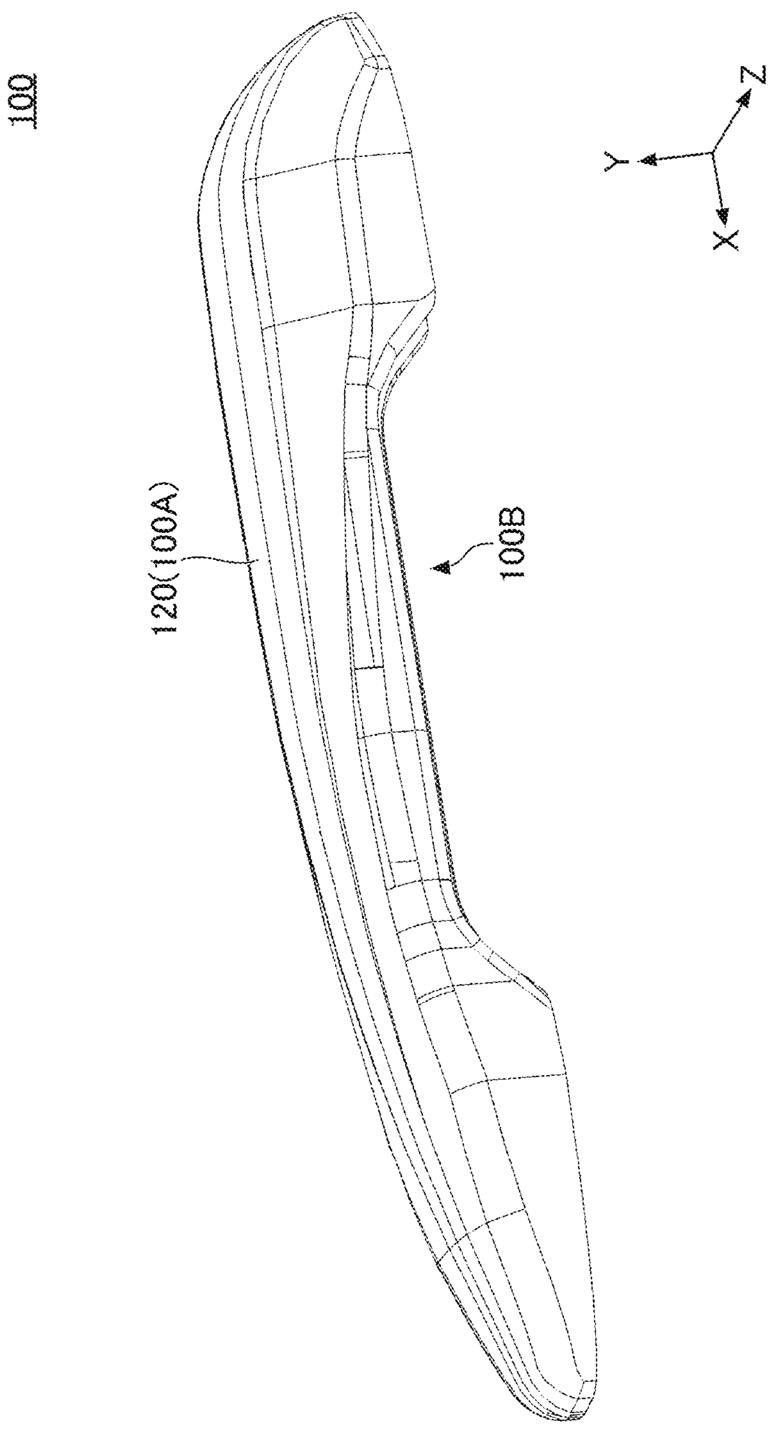
FIG. 1 is a perspective view of an appearance of a door handle according to a first embodiment, as viewed from an exterior of a vehicle.

In related art, it becomes harder for a load to be transmitted to the pressure sensor as the distance from a pressure-applied place of the door handle to the pressure sensor becomes longer, which is why there is a risk of reduction in detection accuracy of the pressure sensor. Thus, for example, such related art needs to dispose a plurality of pressure sensors in order to increase detection accuracy of the pressure applied to the door handle regardless of where the pressure is applied, which raises a risk of complication in configuration.

Hereinafter, one embodiment will be described with reference to the drawings. Note in the following description that, for the sake of convenience, a Z-axis direction (direction corresponding to a height direction of a vehicle) in the drawings is referred to as an upward-downward direction, a Y-axis direction (direction corresponding to a width direction of a vehicle) in the drawings is referred to as a width direction, and an X-axis direction (direction corresponding to a length direction of a vehicle) in the drawings is referred to as a forward-backward direction. Also, a positive Y-axis side in the drawings is referred to as an outer side or a vehicle-outer side, and a negative Y-axis side in the drawings is referred to as an inner side or a vehicle-inner side.

First Embodiment (Overview of a Door Handle 100)

Figure 2:
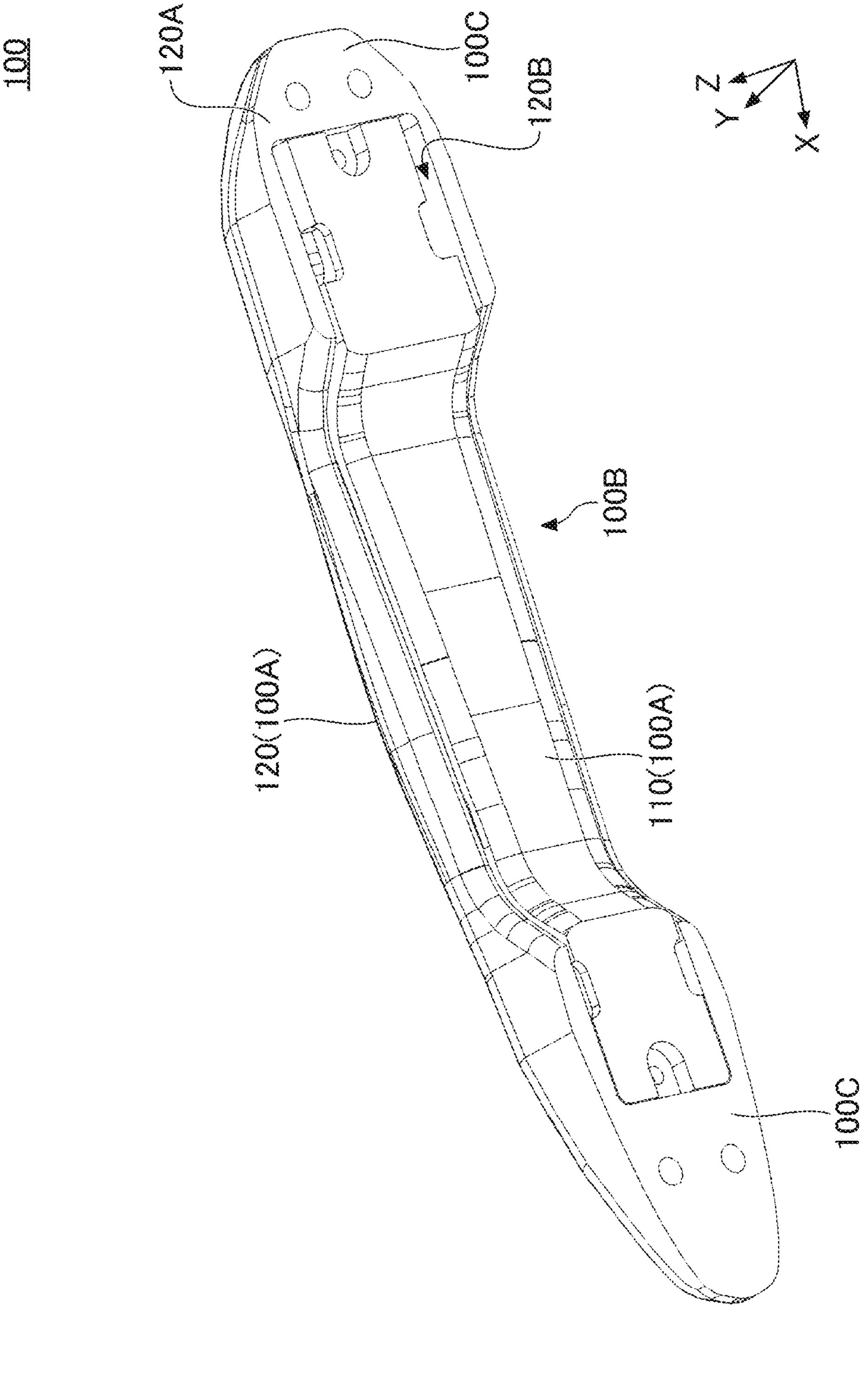
FIG. 2 is a perspective view of an appearance of the door handle according to the first embodiment, as viewed from an interior of the vehicle.

FIG. 1 is a perspective view of an appearance of the door handle 100 according to the first embodiment, as viewed from the vehicle-outer side. FIG. 2 is a perspective view of an appearance of the door handle 100 according to the first embodiment, as viewed from the vehicle-inner side. The door handle 100 as illustrated in FIG. 1 and FIG. 2 is an elongated rod-like part extending along the forward-backward direction (X-axis direction) of the vehicle. The door handle 100 is a part that is attached to a vehicle-outer side-oriented surface 30A (see FIG. 3) of a vehicle door 30, and is held by a hand of a user when the user opens or closes the door 30.

As illustrated in FIG. 1 and FIG. 2, the door handle 100 includes a casing 100A. The casing 100A is a part that forms the entire shape of the door handle 100. The casing 100A is formed of, for example, a resin material such as an ABS (Acrylonitrile Butadiene Styrene) resin, a PC (polycarbonate) resin, or the like. The casing 100A includes an inner casing 110 to be on the vehicle-inner side (negative Y-axis side) and an outer casing 120 to be mainly on the vehicle-outer side (positive Y-axis side). Both of the inner casing 110 and the outer casing 120 have a longitudinal shape in the forward-backward direction (X-axis direction). The casing 100A is formed of the inner casing 110 and the outer casing 120 that are combined with each other.

As illustrated in FIG. 2, an opening 120B extending in the forward-backward direction (X-axis direction) is formed in a vehicle-inner side-oriented surface 120A provided on the vehicle-inner side (negative Y-axis side) of the outer casing 120. The opening 120B has approximately the same shape as the outer shape of the inner casing 110. The inner casing 110 is fitted into the opening 120B.

A recessed portion 100B that is recessed in a shape curved toward the vehicle-outer side (positive Y-axis side) is formed in the center portion of the door handle 100 on the vehicle-inner side (negative Y-axis side) and in the forward-backward direction (X-axis direction). Also, a pair of disposition surfaces 100C that are both flat are provided at both end portions of the door handle 100 on the vehicle-inner side (negative Y-axis side) and in the forward-backward direction (X-axis direction). Note that, the disposition surfaces 100C are formed of: the vehicle-inner side-oriented surface 120A of the outer casing 120; and the vehicle-inner side-oriented surface of a fixed portion 112 provided in the inner casing 110 and the vehicle-inner side-oriented surface of a fixed portion 113 provided in the inner casing 110.

Figure 3:
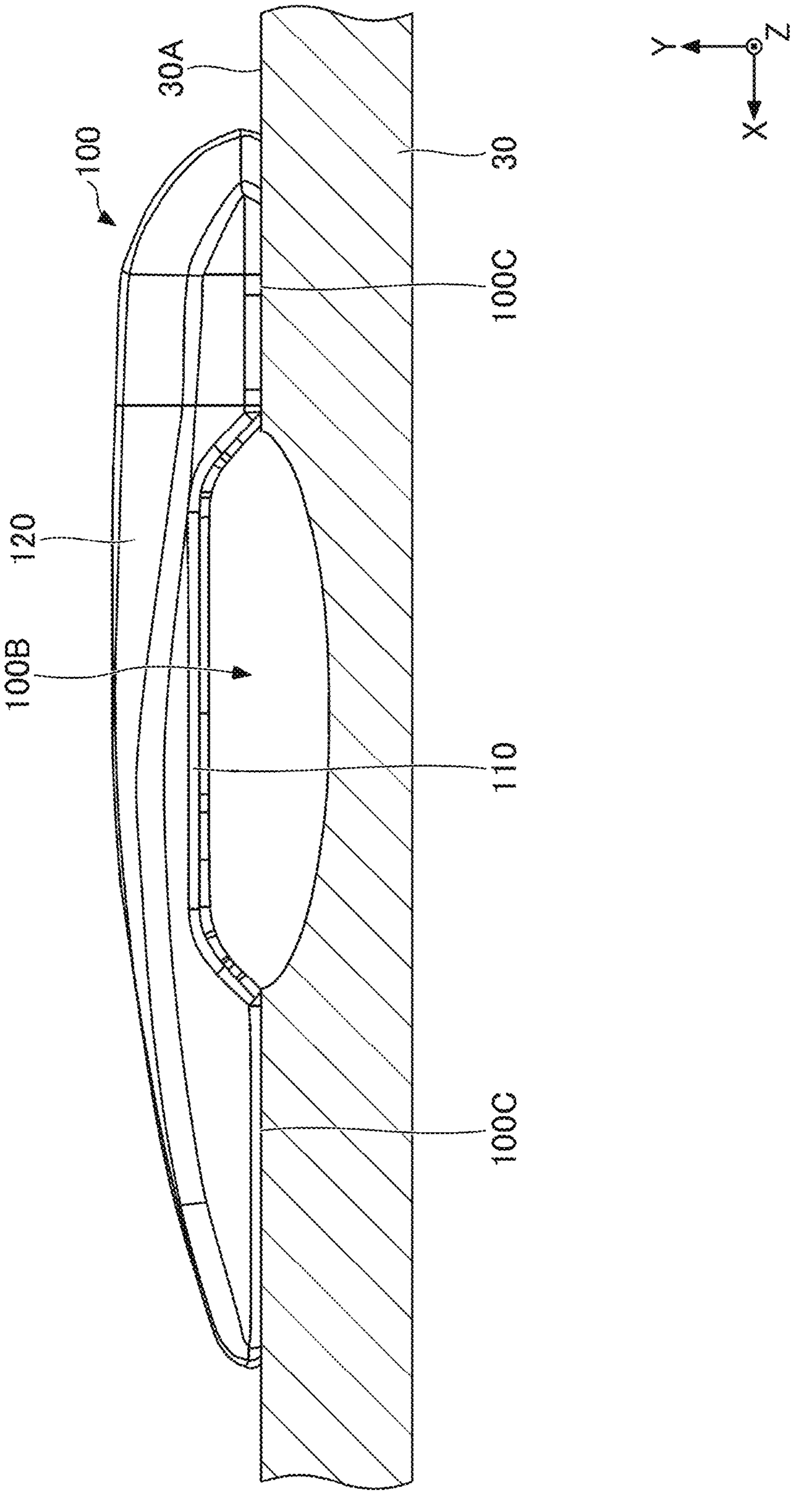
FIG. 3 is a view illustrating a state where the door handle according to the first embodiment is attached.

FIG. 3 is a view illustrating a state where the door handle 100 according to the first embodiment is attached. As illustrated in FIG. 3, the door handle 100 is screw-fastened to the door 30 in a state where the pair of the disposition surfaces 100C are closely attached to the vehicle-outer side-oriented surface 30A of the door 30.

Also, as illustrated in FIG. 3, the door handle 100 has the recessed portion 100B, thereby forming a space into which the user's hand can be inserted, the space being between the door handle 100 and the vehicle-outer side-oriented surface 30A of the door 30 (see FIG. 3). The space enables the user's hand to hold the door handle 100.

(Internal Configuration of the Door Handle 100)

Figure 4:
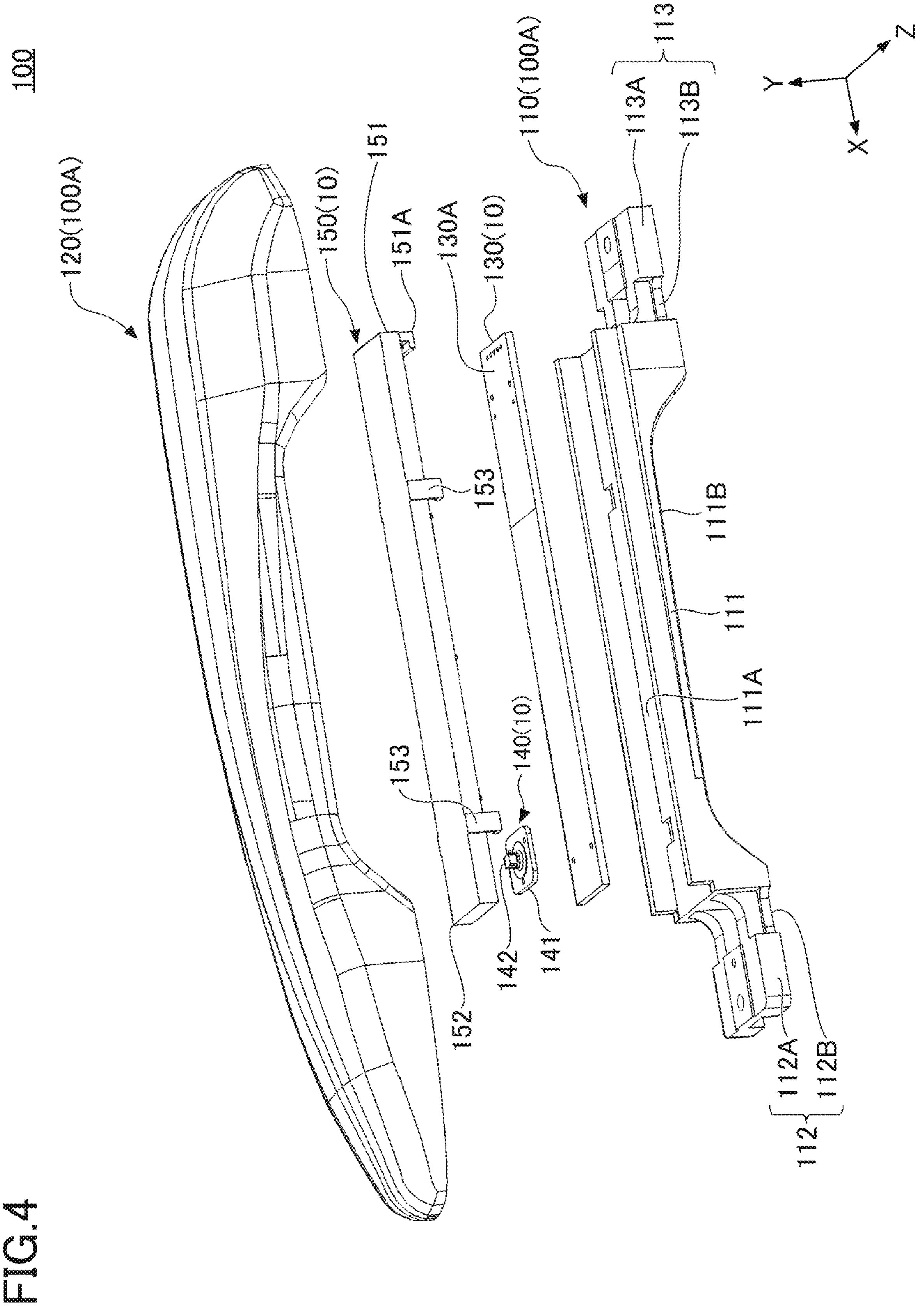
FIG. 4 is an exploded perspective view of the door handle according to the first embodiment.
Figure 5:
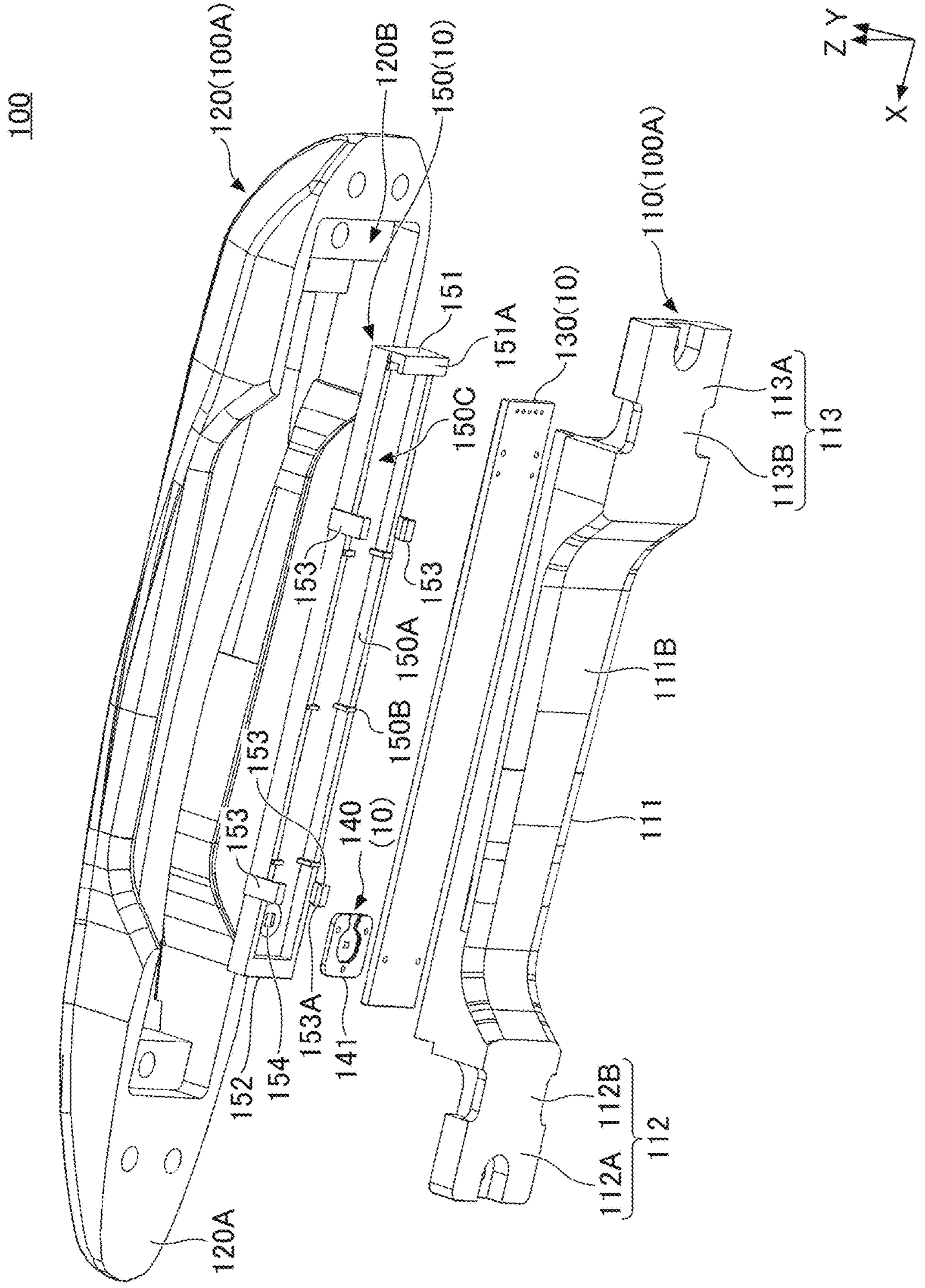
FIG. 5 is an exploded perspective view of the door handle according to the first embodiment.
Figure 6:
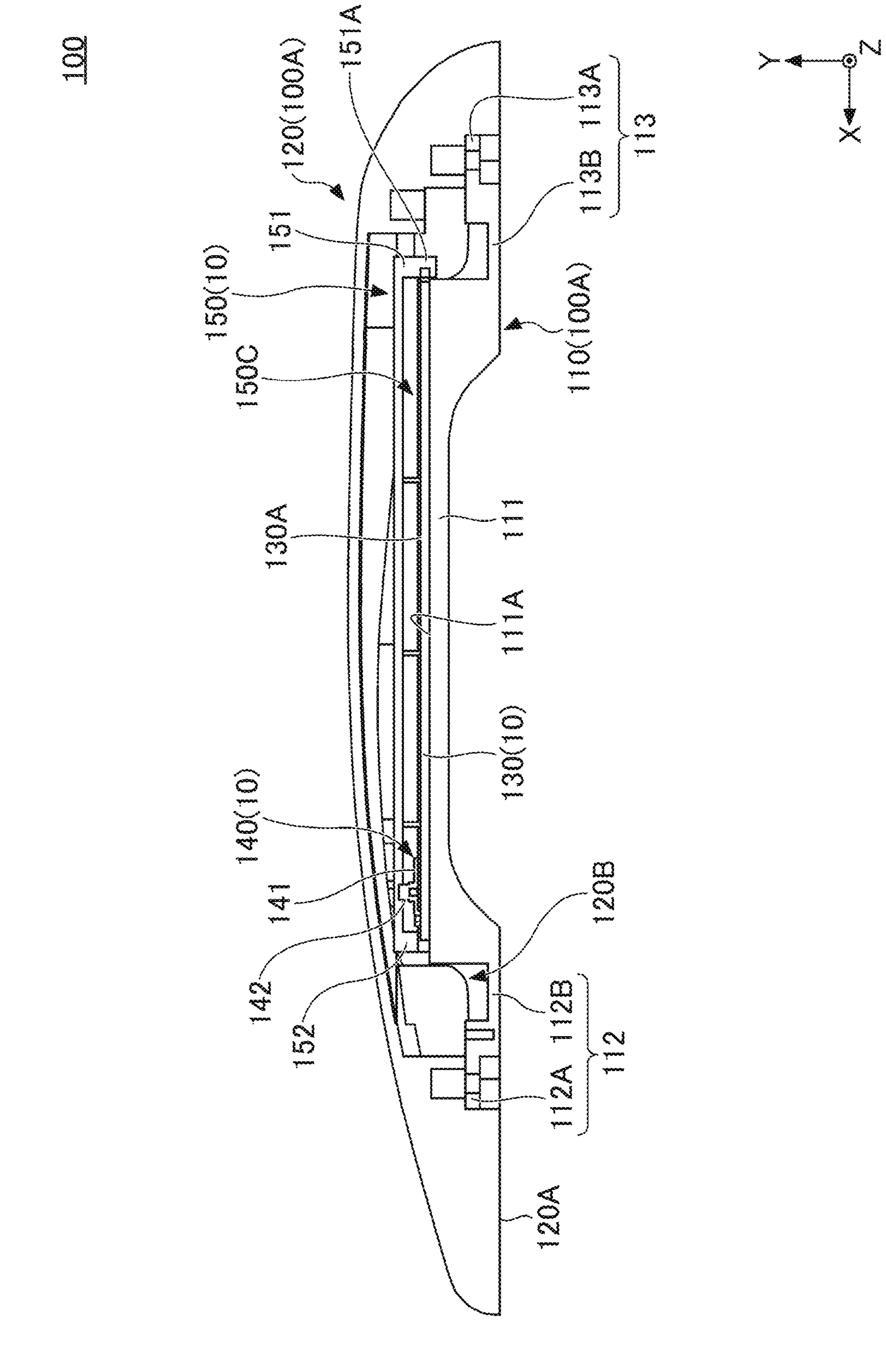
FIG. 6 is a cross-sectional view of the door handle according to the first embodiment.

FIG. 4 and FIG. 5 are an exploded perspective view of the door handle 100 according to the first embodiment. FIG. 6 is a cross-sectional view of the door handle 100 according to the first embodiment, and illustrates a cross section along an XY plane as viewed from above the door handle 100 (positive Z-axis direction) (a cross section passing through the center, in the Z-axis direction, of a shaft 142 of a strain sensor 140).

<Configuration of the Casing 100A>

As illustrated in FIG. 4 to FIG. 6, the door handle 100 includes the casing 100A. The casing 100A is separable into the inner casing 110 and the outer casing 120. The inner casing 110 is integrated with the outer casing 120 by being fitted into the opening 120B (see FIG. 5) that is formed in the outer casing 120 and has approximately the same shape as the inner casing 110. The inner casing 110 includes a holding portion 111, the fixed portion 112, and the fixed portion 113.

The holding portion 111 is a portion that is provided at the center portion of the inner casing 110 in the forward-backward direction (X-axis direction) and has a longitudinal shape extending in the forward-backward direction (X-axis direction). The holding portion 111 is a portion to which a pressure is applied by the user's hand in a vehicle-outer-side direction (positive Y-axis direction) upon opening the door 30. The vehicle-outer side-oriented surface 111A of the holding portion 111 on the vehicle-outer side (positive Y-axis side) is a flat plane. A substrate 130 is disposed at the vehicle-outer side-oriented surface 111A. The vehicle-inner side-oriented surface 111B of the holding portion 111 on the vehicle-inner side (negative Y-axis side) has a curved surface extending along the recessed portion 100B (see FIG. 1 to FIG. 3) of the door handle 100, and forms a part of the recessed portion 100B. The holding portion 111 has a thickness dimension that becomes smaller in the leftward-rightward direction (Y-axis direction) from the end portions in the longitudinal direction (X-axis direction) toward the center portion therein. Thereby, both of the end portions have increased rigidity, and deformation does not tend to occur.

The fixed portion 112 is a portion that is provided at a front-end portion (an end portion of the front of the vehicle) of the inner casing 110 in the forward-backward direction (X-axis direction) and is fixed to the outer casing 120. The fixed portion 112 is a portion that has a shape of an approximately flat plate and is provided to extend forward (positive X-axis direction) from a front-end portion of the holding portion 111. The fixed portion 112 includes a base portion 112A and a base connection portion 112B. The base portion 112A is provided to be apart from the front-end portion of the holding portion 111. The base portion 112A is a portion that is screw-fastened to the outer casing 120 with a screw (not illustrated) that penetrates the base portion 112A in the Y-axis direction. The base connection portion 112B is provided so as to establish connection between the base portion 112A and the front-end portion of the holding portion 111. Note that, the dimension of the base connection portion 112B in the height direction (Z-axis direction) is set so that deformation does not readily occur upon application of a pressure to the holding portion 111.

The fixed portion 113 is a portion that is provided at a back-end portion (an end portion of the back of the vehicle) of the inner casing 110 in the forward-backward direction (X-axis direction) and is fixed to the outer casing 120. The fixed portion 113 has a symmetrical shape with the fixed portion 112 with respect to a YZ plane. The fixed portion 113 is a portion that has a shape of an approximately flat plate and is provided to extend backward (negative X-axis direction) from a back-end portion of the holding portion 111. The fixed portion 113 includes a base portion 113A and a base connection portion 113B. The base portion 113A is provided to be apart from the back-end portion of the holding portion 111. The base portion 113A is a portion that is screw-fastened to the outer casing 120 with a screw (not illustrated) that penetrates the base portion 113A in the Y-axis direction. The base connection portion 113B is provided so as to establish connection between the base portion 113A and the back-end portion of the holding portion 111. Note that, the dimension of the base connection portion 113B in the height direction (Z-axis direction) is set so that deformation does not readily occur upon application of a pressure to the holding portion 111.

<Configuration of Interior of the Casing 100A>

Also, as illustrated in FIG. 4 to FIG. 6, the door handle 100 includes the substrate 130, the strain sensor 140, and a holder 150, in the interior of the casing 100A. The substrate 130, the strain sensor 140, and the holder 150 form a detection device 10.

The substrate 130 is one example of the "base portion". The substrate 130 is an elastically deformable member formed of a resin and having a flat-plate shape, and extends in the forward-backward direction serving as the longitudinal direction. The substrate 130 is fixedly disposed by a given fixing means (e.g., double-sided tape) to the vehicle-outer side-oriented surface 111A on the vehicle-outer side (positive Y-axis side) of the holding portion 111 of the inner casing 110. Thereby, the substrate 130 is elastically deformed so as to be curved to project toward the vehicle-outer side together with the holding portion 111 of the inner casing 110 upon application of a pressure to the door handle 100.

The strain sensor 140 is mounted in a front-end portion (an end portion on a positive X-axis side) in a vehicle-outer side-oriented surface 130A of the substrate 130, and detects application of a pressure to the door handle 100. As illustrated in FIG. 4 and FIG. 6, the strain sensor 140 includes a fixed portion 141 and the shaft 142.

The fixed portion 141 is a flat plate-shaped portion that is rectangular in a plan view thereof, and is formed of a synthetic resin or a ceramic. The fixed portion 141 is fixed, in a vehicle-inner side (negative Y-axis side)-oriented surface, to the front-end portion (the end portion on the positive X-axis side) in the vehicle-outer side-oriented surface 130A of the substrate 130.

The shaft 142 is integrally formed with the fixed portion 141, and has a columnar shape projecting toward the vehicle-outer side (positive Y-axis side) from the center portion in a vehicle-outer side (positive Y-axis side)-oriented surface of the fixed portion 141. A front-end portion of the shaft 142 is fitted into a recessed portion 154 (see FIG. 5) formed in a vehicle-inner side-oriented surface of the holder 150.

Upon application of a pressure to the door handle 100, strain occurs in the fixed portion 141 of the strain sensor 140 in response to the shaft 142 being tilted in the X-axis direction by the holder 150 displaced in the X-axis direction. A vehicle-inner side (negative Y-axis side)-oriented surface of the fixed portion 141 is provided with a plurality of strain elements (not illustrated). By the plurality of strain elements, the strain sensor 140 can detect strain of the fixed portion 141, i.e., application of a pressure to the door handle 100.

The holder 150 is one example of the "displaceable member". The holder 150 is an elastically deformable member formed of a resin and having a flat-plate shape, and extends in the forward-backward direction (X-axis direction) serving as the longitudinal direction. That is, the holder 150 has a longitudinal shape extending along the longitudinal direction of the door handle 100. Also, the holder 150 is provided to face the vehicle-outer side-oriented surface 130A of the substrate 130.

The holder 150 includes a connection portion 151A provided at one end portion 151 that is an end portion on a back side thereof (negative X-axis side). The holder 150 is fixedly connected to an end portion of the substrate 130 on a back side thereof (negative X-axis side) by the connection portion 151A. The other end 152 of the holder 150, which is an end portion on a front side thereof (positive X-axis side), is the displaceable portion. In accordance with deformation (curving) of the substrate 130, the displaceable portion is deformed relatively to the substrate 130 in the longitudinal direction (X-axis direction) of the door handle 100.

The holder 150 includes a lateral wall 150A, a plurality of projecting portions 150B, and a plurality of leg portions 153. Each of the plurality of leg portions 153 extends toward the substrate 130 from an upper (positive Z-axis side) lateral surface and a lower (negative Z-axis side) lateral surface of the holder 150. The leg portions 153 maintain a constant distance in the Y-axis direction between the holder 150 and the substrate 130. Specifically, each leg portion 153 includes a tip-end portion 153A extending beyond the substrate 130, and the tip-end portion 153A is formed into a shape folded at the right angle inward of the holder 150 (toward the center portion of the holder 150 in the Z-axis direction). Edge portions of the substrate 130 are held between the tip-end portions 153A and the plurality of projecting portions 150B of the holder 150. Thereby, the leg portions 153 and the projecting portions 150B enable the holder 150 to move relative to the substrate 130 in the forward-backward direction (X-axis direction), and hold the edge portions of the holder 150 so as to restrict movements of the holder 150 in the leftward-rightward direction (Y-axis direction) and in the upward-downward direction (Z-axis direction). Note that, the present embodiment employs a configuration in which the lateral wall 150A, the plurality of projecting portions 150B, and the plurality of leg portions 153 are provided, and the edge portions of the substrate 130 are held between the tip-end portion 153A and the plurality of projecting portions 150B of the holder 150, as a configuration of enabling the holder 150 to move relative to the substrate 130 in the forward-backward direction (X-axis direction) and restricting the movements of the holder 150 in the leftward-rightward direction (Y-axis direction) and in the upward-downward direction (Z-axis direction). However, a position of the substrate 130 to be held is not limited to the edge portions of the substrate 130. For example, an opening groove along the X direction may be provided at a center of the substrate 130 in the Z-axis direction, and both inner edge portions of this opening groove in the Z-axis direction may be held by the tip-end portions 153A and the plurality of projecting portions 150B of the holder 150.

In response to application of a pressure to the door handle 100, the holder 150 connected to the substrate 130 by the plurality of leg portions 153 is elastically deformed so as to be curved to project toward the vehicle-outer side together with the holding portion 111 of the inner casing 110, and the substrate 130.

The holder 150 has a hollow portion 150C having a shape recessed from the vehicle-inner side (negative Y-axis side)-oriented surface toward the vehicle-outer side (positive Y-axis side) over the entire region in the longitudinal direction (X-axis direction). The hollow portion 150C can house the strain sensor 140 mounted to the vehicle-outer side-oriented surface 130A of the substrate 130. Note that, in the present embodiment, the hollow portion 150C is defined by the lateral wall 150A; however, this is by no means a limitation. For example, the hollow portion 150C may be formed by a recessed portion having a shape recessed toward the vehicle-outer side (positive Y-axis side).

The recessed portion 154 (see FIG. 5) having a shape recessed toward the vehicle-outer side (positive Y-axis side) is formed at a bottom surface of the hollow portion 150C of the holder 150 and at a position facing the shaft 142 of the strain sensor 140 (i.e., the other end portion 152 that is the displaceable portion of the holder 150). The recessed portion 154 is one example of an "engaging portion". The tip-end portion of the shaft 142 of the strain sensor 140 is fitted into and engaged with the recessed portion 154. Thereby, the door handle 100 according to the first embodiment is configured such that, in response to application of a pressure to the door handle 100, the holder 150 tilts the shaft 142 of the strain sensor 140 in the X-axis direction in accordance with displacement of the holder 150 in the X-axis direction. Note that, a method of engaging the holder 150 with the shaft 142 is not limited to fitting, and other methods (e.g., adhesive bonding, fitting followed by adhesive bonding, or the like) may be used.

(Motions of the Detection Device 10)

Figure 7A:
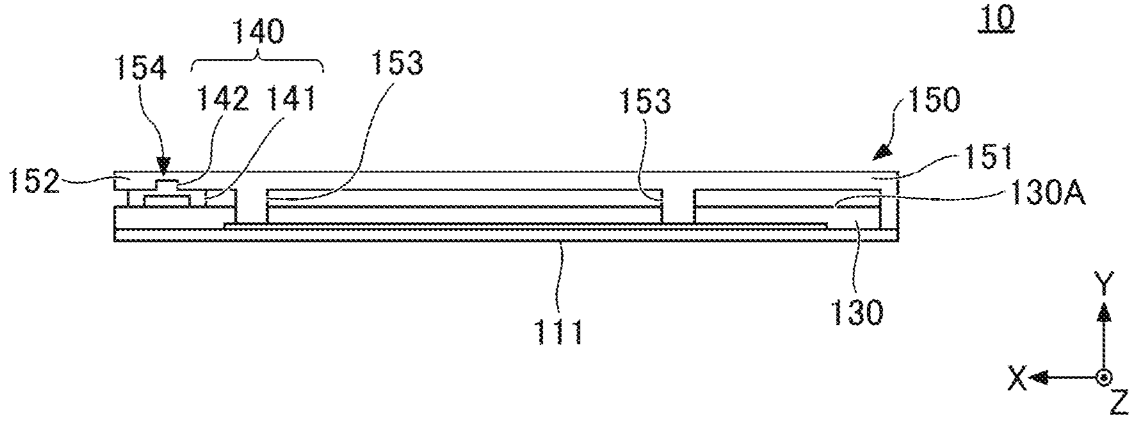
FIG. 7A is a view schematically illustrating motions of a detection device according to the first embodiment.
Figure 7B:
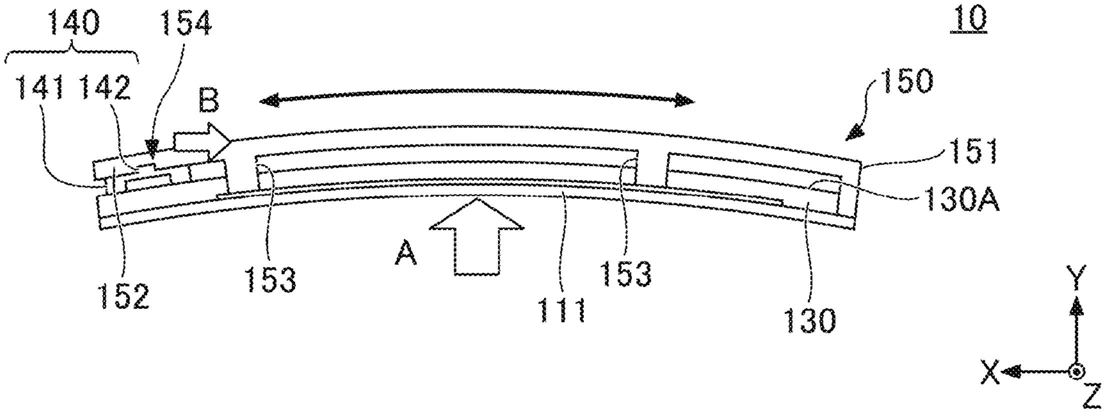
FIG. 7B is a view schematically illustrating the motions of the detection device according to the first embodiment.

FIG. 7A and FIG. 7B are a view schematically illustrating the motions of the detection device 10 according to the first embodiment. The detection device 10 according to the first embodiment can detect the pressure applied by the user's hand to the inner casing 110 by the strain sensor 140.

A specific case thereof will be described. In this case, a pressure is applied by the user's hand to the holding portion 111 of the inner casing 110 of the door handle 100 in a vehicle-outer side direction (positive Y-axis direction) (arrow A in FIG. 7B).

As illustrated in FIG. 7A, when no pressure is applied to the holding portion 111, the front-end portion (the end portion on the positive X-axis side) of the substrate 130 and the front-end portion (the end portion on the positive X-axis side) of the holder 150 are at the same position in the forward-backward direction (X-axis direction).

Also, as illustrated in FIG. 7A, the fixed portion 141 of the strain sensor 140 is fixed to the vehicle-outer side-oriented surface 130A of the substrate 130. Also, the front-end portion of the shaft 142 of the strain sensor 140 is fitted into the recessed portion 154 provided in the front-end portion (the end portion on the positive X-axis side) of the holder 150.

Meanwhile, as illustrated in FIG. 7B, in response to application of a pressure to the holding portion 111 of the inner casing 110, elastic deformation occurs so that the holding portion 111 deflects toward the vehicle-outer side (positive Y-axis side) because both end portions (fixed portions 112 and 113) of the inner casing 110 are fixed to the outer casing 120. At the same time, the substrate 130 and the holder 150 are elastically deformed so as to deflect toward the vehicle-outer side (positive Y-axis side) together with the holding portion 111. At this time, as illustrated in FIG. 7B, the substrate 130 and the holder 150 cause, owing to the difference in radius of curvature therebetween, displacement in the forward-backward direction (X-axis direction) between the front-end portion (the end portion on the positive X-axis side) of the substrate 130 and the front-end portion (the end portion on the positive X-axis side) of the holder 150.

Thereby, as illustrated in FIG. 7B, the front-end portion (the end portion on the positive X-axis side) of the holder 150 is displaced backward (negative X-axis direction) relatively to the front-end portion (the end portion on the positive X-axis side) of the substrate 130 (arrow B in FIG. 7B). As a result, the front-end portion (the end portion on the positive X-axis side) of the holder 150 can tilt the shaft 142 of the strain sensor 140 backward (negative X-axis direction).

In the strain sensor 140, tilting of the shaft 142 causes strain of the fixed portion 141. The strain sensor 140 detects the strain of the fixed portion 141 by the plurality of strain elements (not illustrated) and outputs a strain detection signal representing the strain as a pressure detection signal representing application of a pressure by the user's hand. Note that, the strain sensor 140 may be a strain sensor including a single strain element in the forward-backward direction (X direction) as long as at least one strain element is disposed so as to detect a pressure applied to the inner casing 110 by the user's hand.

The detection device 10 according to the first embodiment is the detection device 10 provided in the interior of the vehicle door handle 100 including the inner casing 110. The detection device 10 includes: the substrate 130 that has a longitudinal shape extending along a longitudinal direction of the door handle 100, is disposed fixedly to the inner casing 110, and is configured to deform in response to a pressure applied to the inner casing 110; the holder 150 that has a longitudinal shape extending along the longitudinal direction of the door handle 100 and is provided to face the substrate 130, in which the one end portion 151 is connected to the substrate 130, and that includes a displaceable portion configured to be displaced relatively to the substrate 130 in accordance with deformation of the substrate 130; and the strain sensor 140 configured to detect displacement of the displaceable portion.

Thereby, the detection device 10 according to the first embodiment can deform the substrate 130 and the holder 150 together with the inner casing 110 in response to application of a pressure to the inner casing 110, and displace the displaceable portion of the holder 150 relatively to the substrate 130. Therefore, the detection device 10 according to the first embodiment detects displacement of the displaceable portion of the holder 150 by the strain sensor 140 at a single site thereof, and can more reliably detect the pressure applied to the inner surface of the door handle 100 in a relatively simple configuration.

According to the detection device 10 according to the first embodiment, the one end portion 151 of the holder 150 is connected to the substrate 130, the other end portion 152 thereof is the displaceable portion, and the displaceable portion is displaced in the longitudinal direction of the door handle 100.

Thereby, the detection device 10 according to the first embodiment can detect displacement of the other end portion 152 (displaceable portion) of the holder 150 in the longitudinal direction of the door handle 100 in response to application of a pressure to the inner casing 110, and can more reliably detect the pressure applied to the inner surface of the door handle 100 in a relatively simple configuration. Note that, in the present embodiment, displacement of the other end portion 152 the farthest from the connection portion 151A is detected. In the present embodiment, therefore, it is possible to detect large displacement in accordance with the difference in radius of curvature upon deflection of the substrate 130 and the holder 150. However, rather than detecting the displacement of the other end portion 152 of the holder 150, displacement of a middle portion of the holder 150 may be detected.

Also, according to the detection device 10 according to the first embodiment, the holder 150 includes the plurality of leg portions 153 extending toward the substrate 130 and retaining the edge portions of the substrate 130.

Thereby, the detection device 10 according to the first embodiment can maintain a constant distance between the holder 150 and the substrate 130, and in response to application of a pressure to the inner casing 110, can deform the holder 150 together with the substrate 130 and detect large displacement in accordance with the difference in radius of curvature. However, the leg portions 153 are not necessarily essential. When the leg portions 153 are omitted, the substrate 130 deforms but the holder 150 does not deform in response to application of a pressure to the inner casing 110. With the leg portions 153 being omitted, the amount of relative displacement is smaller than when both of the substrate 130 and the holder 150 deform. However, displacement in the X-axis direction relatively occurs between the substrate 130 and the holder 150, and a tilting load can be applied to the shaft 142. Therefore, it is possible to detect the pressure applied to the inner casing 110. In this way, the holder 150 does not necessarily deform concentrically with the substrate 130 as long as displacement in the X-axis direction relatively occurs between the substrate 130 and the holder 150, and a tilting load can be applied to the shaft 142.

The strain sensor 140 in the detection device 10 according to the first embodiment is the strain sensor 140 configured to detect strain occurring in accordance with the displacement of the displaceable portion of the holder 150 in the longitudinal direction of the door handle 100.

Thereby, the detection device 10 according to the first embodiment causes strain in the strain sensor 140, and can more reliably detect the displacement of the other end portion 152 (displaceable portion) of the holder 150 in the longitudinal direction of the door handle 100.

In the detection device 10 according to the first embodiment, the strain sensor 140 includes the fixed portion 141 disposed fixedly to the substrate 130 and the shaft 142 projecting toward the holder 150 from the fixed portion 141, and the shaft 142 is engaged with the recessed portion 154 provided in the displaceable portion.

Thereby, the detection device 10 according to the first embodiment causes strain in the strain sensor 140 by tilting the shaft 142, and can more reliably detect the displacement of the other end portion 152 (displaceable portion) of the holder 150 in the longitudinal direction of the door handle 100. Note that, the recessed portion 154 may be, for example, a through-hole or anything as long as the shaft 142 is tilted in accordance with the displacement of the other end portion 152 (displaceable portion).

(First Modified Example of the Detection Device 10)

Figure 8:
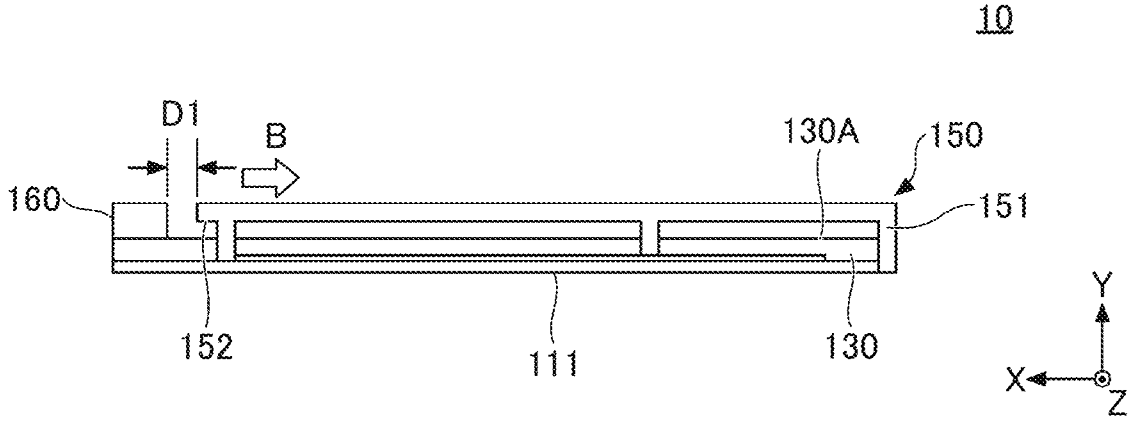
FIG. 8 is a view schematically illustrating a first modified example of the detection device according to the first embodiment.

FIG. 8 is a view schematically illustrating the first modified example of the detection device 10 according to the first embodiment. As illustrated in FIG. 8, the detection device 10 according to the first modified example of the first embodiment includes, instead of the strain sensor 140 of the first embodiment, an optical distance sensor 160 configured to detect a movement distance of the other end portion 152 of the holder 150 in the longitudinal direction (X-axis direction) of the door handle 100. In the example as illustrated in FIG. 8, the distance sensor 160 is provided at the vehicle-outer side-oriented surface 130A of the substrate 130, facing the other end portion 152 of the holder 150 forward (positive X-axis side) of the other end portion 152 of the holder 150. The detection device 10 according to the first embodiment detects the displacement of the other end portion 152 (displaceable portion), thereby detecting the pressure applied to the inner casing 110, in response to which the other end portion 152 (displaceable portion) deforms. In the first modified example, however, the distance sensor 160 detects change (displacement) in distance D1 between the distance sensor 160 and the other end portion 152 (the displaceable portion) of the holder 150, thereby detecting the pressure applied to the inner casing 110.

(Second Modified Example of the Detection Device 10)

Figure 9:
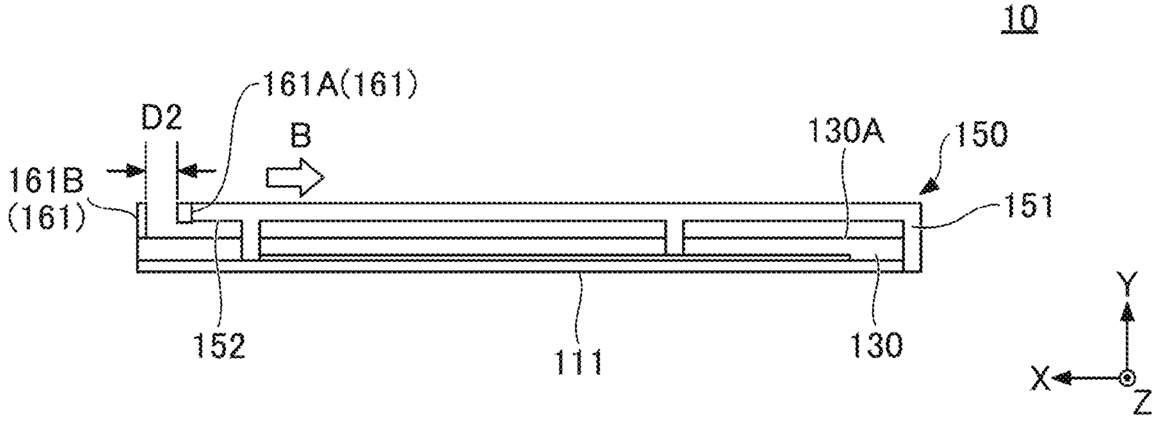
FIG. 9 is a view schematically illustrating a second modified example of the detection device according to the first embodiment.

FIG. 9 is a view schematically illustrating the second modified example of the detection device 10 according to the first embodiment. As illustrated in FIG. 9, the detection device 10 according to the second modified example of the first embodiment includes, instead of the strain sensor 140 of the first embodiment, an electrostatic sensor 161 configured to detect change in electrostatic capacity in accordance with movement of the other end portion 152 of the holder 150 in the longitudinal direction (X-axis direction) of the door handle 100. A difference from the first modified example is measuring the distance electrostatically, not optically. In the example as illustrated in FIG. 9, the electrostatic sensor 161 includes a first electrode 161A and a second electrode 161B. The first electrode 161A is provided at the other end portion 152 of the holder 150. The second electrode 161B is provided at the vehicle-outer side-oriented surface 130A of the substrate 130, facing the first electrode 161A forward (positive X-axis side) of the first electrode 161A. The detection device 10 according to the second modified example relies, in response to application of a pressure to the inner casing 110, on the electrostatic sensor 161 to detect change in electrostatic capacity in accordance with change in distance D2 between the first electrode 161A and the second electrode 161B, thereby detecting displacement of the other end portion 152 (displaceable portion) in the X direction and detecting the pressure applied to the inner casing 110.

(Third Modified Example of the Detection Device 10)

Figure 10:
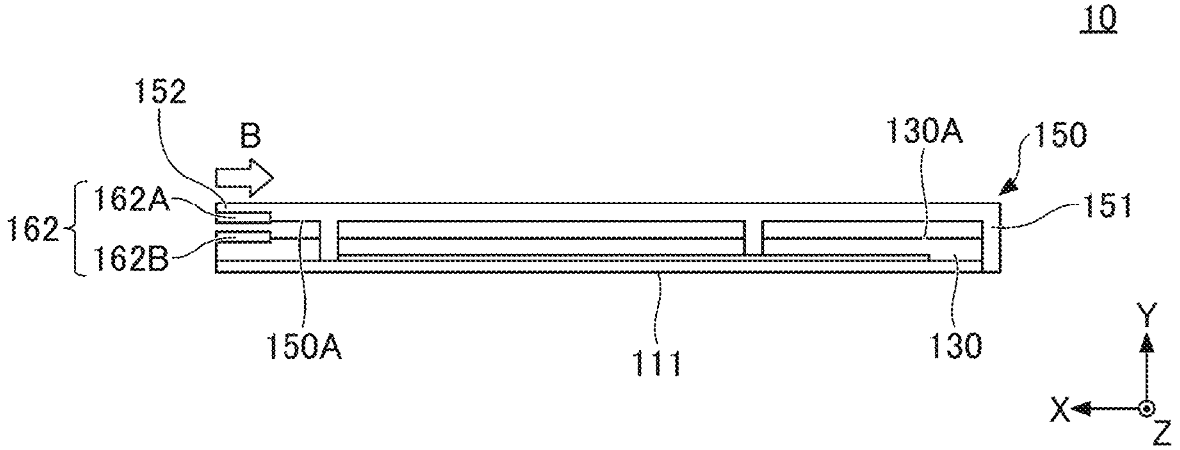
FIG. 10 is a view schematically illustrating a third modified example of the detection device according to the first embodiment.

FIG. 10 is a view schematically illustrating the third modified example of the detection device 10 according to the first embodiment. As illustrated in FIG. 10, the detection device 10 of the third modified example of the first embodiment includes, instead of the strain sensor 140 of the first embodiment, an electrostatic sensor 162 configured to detect change in electrostatic capacity in accordance with movement of the other end portion 152 of the holder 150 in the longitudinal direction (X-axis direction) of the door handle 100. In the example as illustrated in FIG. 10, the electrostatic sensor 162 includes a first electrode 162A and a second electrode 162B. The first electrode 162A is provided at the vehicle-inner side-oriented surface 150A in the other end portion 152 of the holder 150. The second electrode 162B is provided at the vehicle-outer side-oriented surface 130A of the substrate 130, facing the first electrode 162A. The detection device 10 according to the third modified example relies, in response to application of a pressure to the inner casing 110, on the electrostatic sensor 162 to detect change in electrostatic capacity in accordance with change in overlapping area between the first electrode 162A and the second electrode 162B, thereby detecting displacement of the other end portion 152 (displaceable portion) in the X direction and detecting the pressure applied to the inner casing 110.

(Fourth Modified Example of the Detection Device 10)

Figure 11:
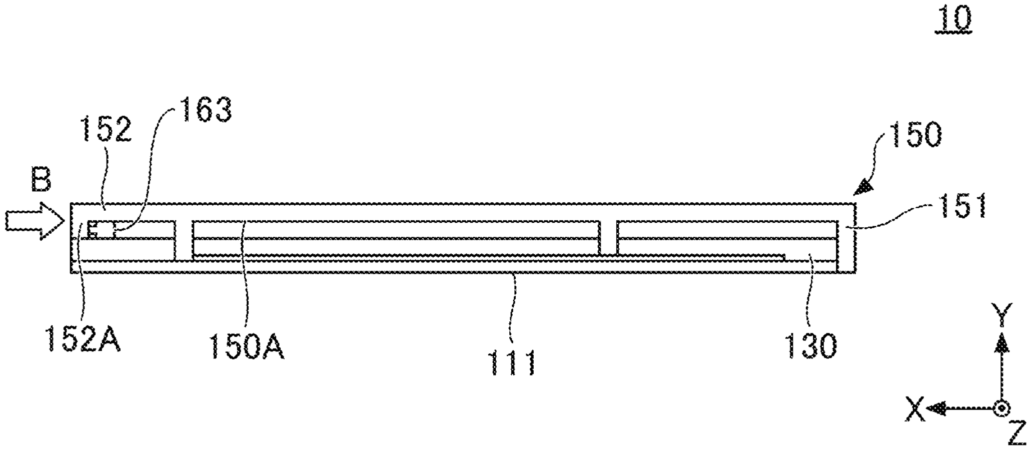
FIG. 11 is a view schematically illustrating a fourth modified example of the detection device according to the first embodiment.

FIG. 11 is a view schematically illustrating the fourth modified example of the detection device 10 according to the first embodiment. As illustrated in FIG. 11, the detection device 10 according to the fourth modified example of the first embodiment includes, instead of the strain sensor 140 of the first embodiment, a piezoelectric sensor 163 configured to detect a pressure in accordance with movement of the other end portion 152 of the holder 150 in the longitudinal direction (X-axis direction) of the door handle 100. In the example as illustrated in FIG. 11, the piezoelectric sensor 163 is an approximately quadrilateral shape in which the center portion of an X-side lateral surface projects. Also, the vehicle-inner side-oriented surface 150A in the other end portion 152 of the holder 150 is provided with a projecting portion 152A that projects toward the vehicle-inner side (substrate 130-side). In the example as illustrated in FIG. 11, the piezoelectric sensor 163 is provided at the vehicle-outer side-oriented surface 130A of the substrate 130 backward (negative X-axis side) of the projecting portion 152A, and the projecting portion 152A and the piezoelectric sensor 163 are provided to contact each other. The detection device 10 according to the fourth modified example detects, in response to application of a pressure to the inner casing 110, change in compressive force applied by the projecting portion 152A to the piezoelectric sensor 163, thereby detecting displacement of the other end portion 152 (displaceable portion) in the X direction and detecting the pressure applied to the inner casing 110.

(Fifth Modified Example of the Detection Device 10)

Figure 12:
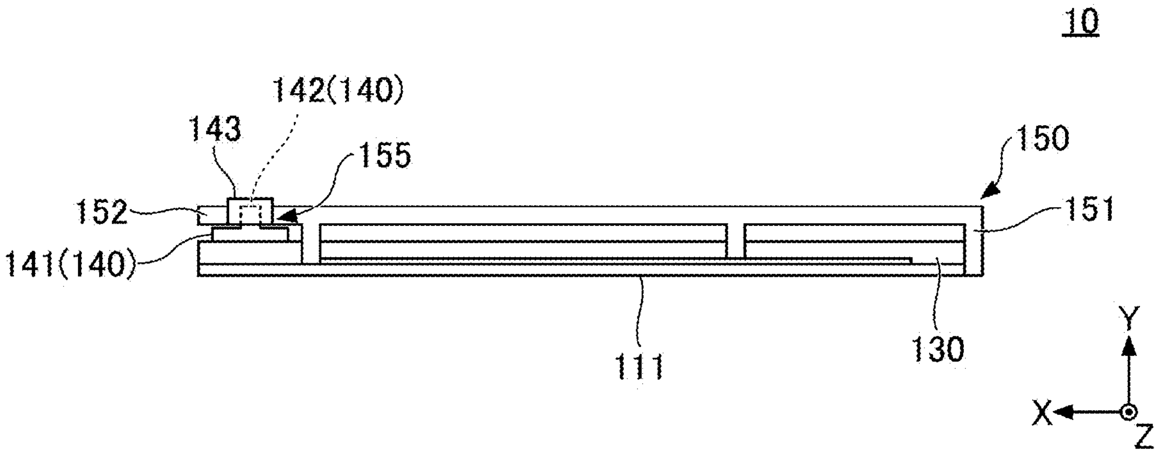
FIG. 12 is a view schematically illustrating a fifth modified example of the detection device according to the first embodiment.

FIG. 12 is a view schematically illustrating the fifth modified example of the detection device 10 according to the first embodiment. As illustrated in FIG. 12, the detection device 10 according to the fifth modified example of the first embodiment includes an elastic cap 143 attached to the shaft 142 of the strain sensor 140, and the elastic cap 143 may be fitted into an opening 155 provided in the other end portion 152 of the holder 150. Thereby, the detection device 10 according to the fifth modified example can bond the shaft 142 and the other end portion 152 with each other without rattling. Also, in the first embodiment, in order to enable detection even if a low load is applied to the inner casing 110, there is a need to fit the front-end portion of the shaft 142 into the recessed portion 154 without rattling. However, due to issues of parts' accuracy and fitting accuracy, there may be a case in which fitting is performed in a state where the distance between the connection portion 151A and the recessed portion 154 is different from the distance between the end portion of the substrate 130 backward (negative X-axis side) thereof and the front-end portion of the shaft 142. This being the case, even in a state where no pressure is applied to the holding portion 111, the initial load becomes applied to a portion from the other end portion 152 of the holder 150 to the shaft 142 of the strain sensor 140. However, provision of the elastic cap 143 can avoid application of a large force in the initial state.

Figure 13:
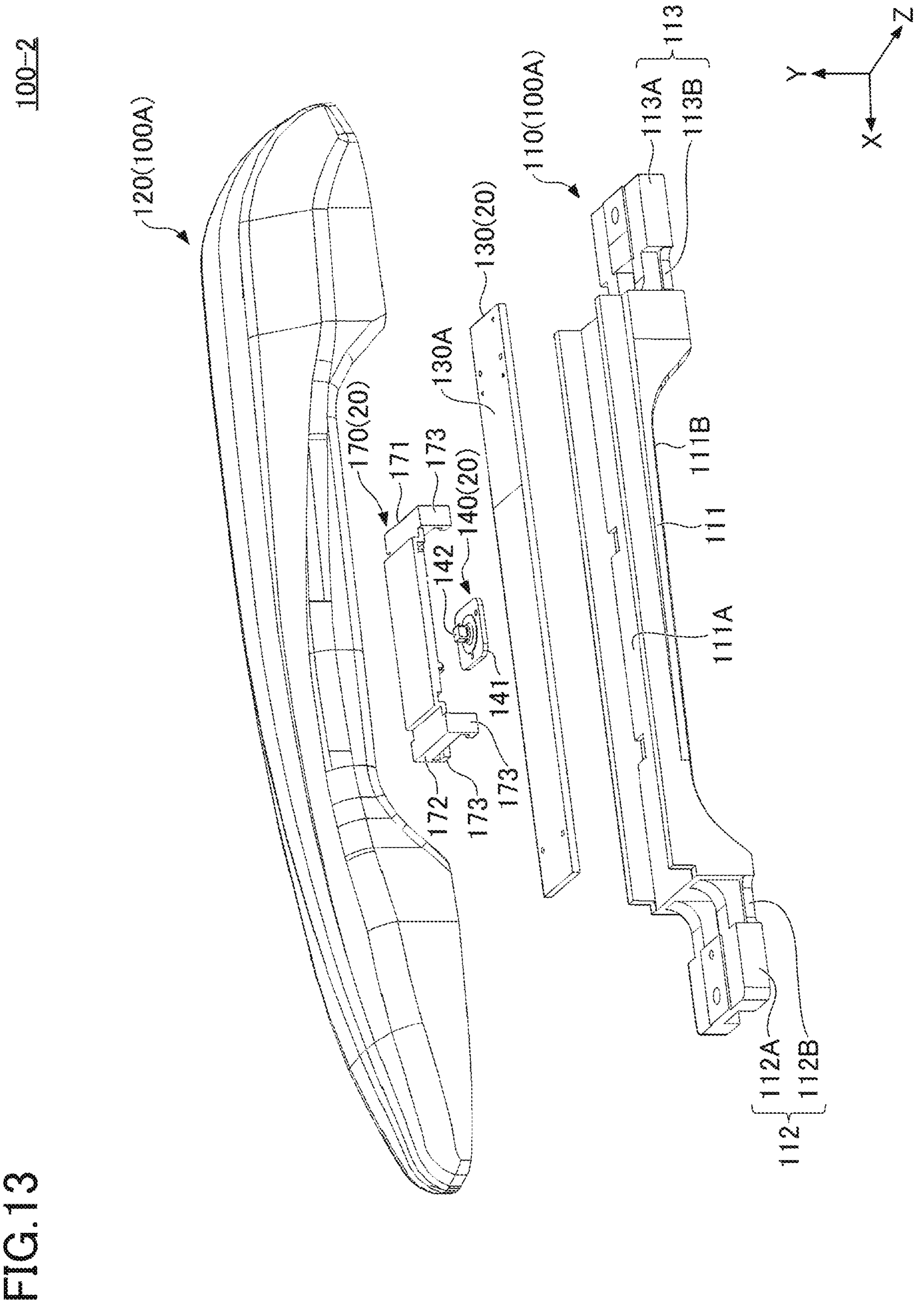
FIG. 13 is an exploded perspective view of a door handle according to a second embodiment.
Figure 14:
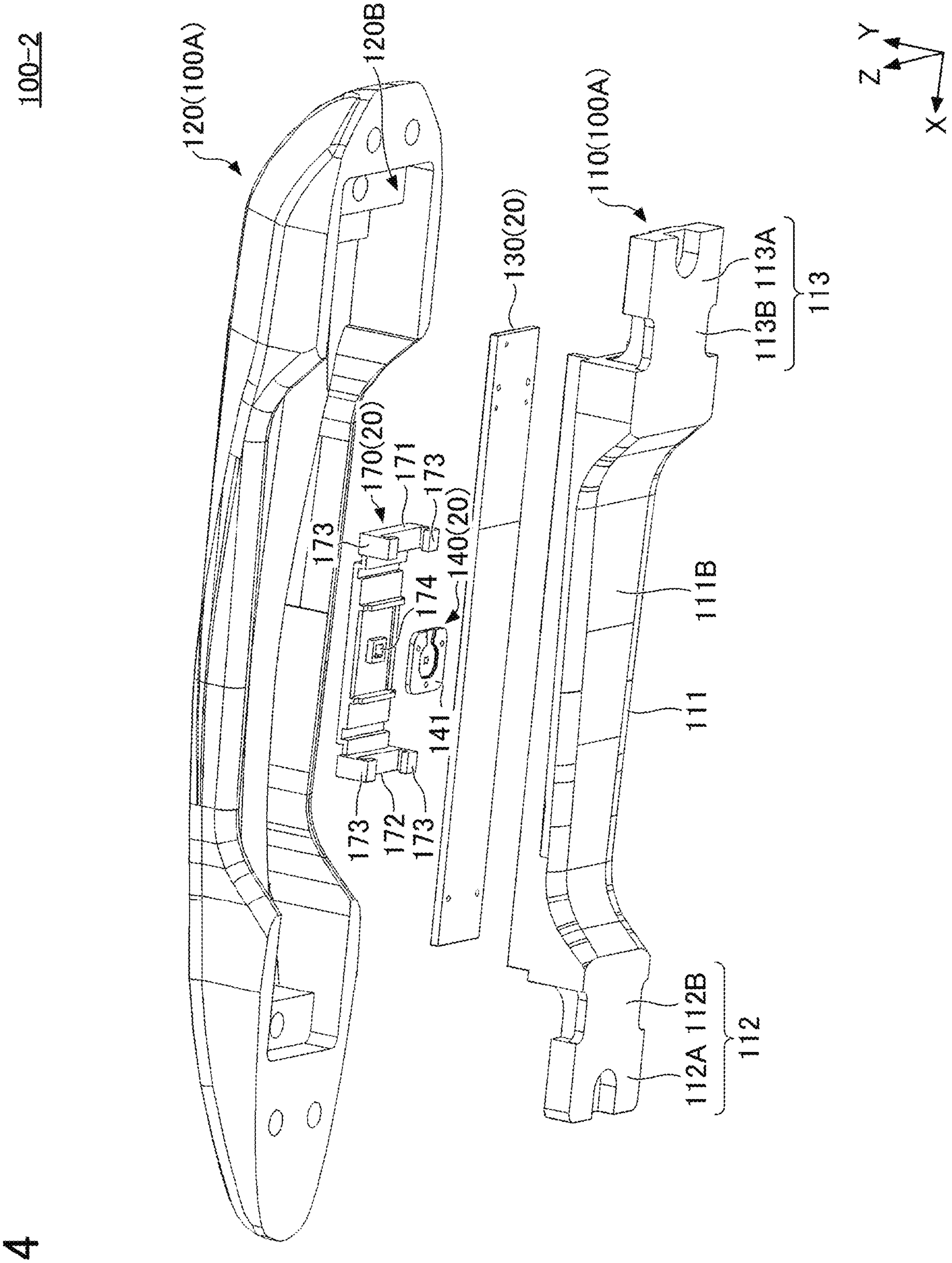
FIG. 14 is an exploded perspective view of the door handle according to the second embodiment.
Figure 15:
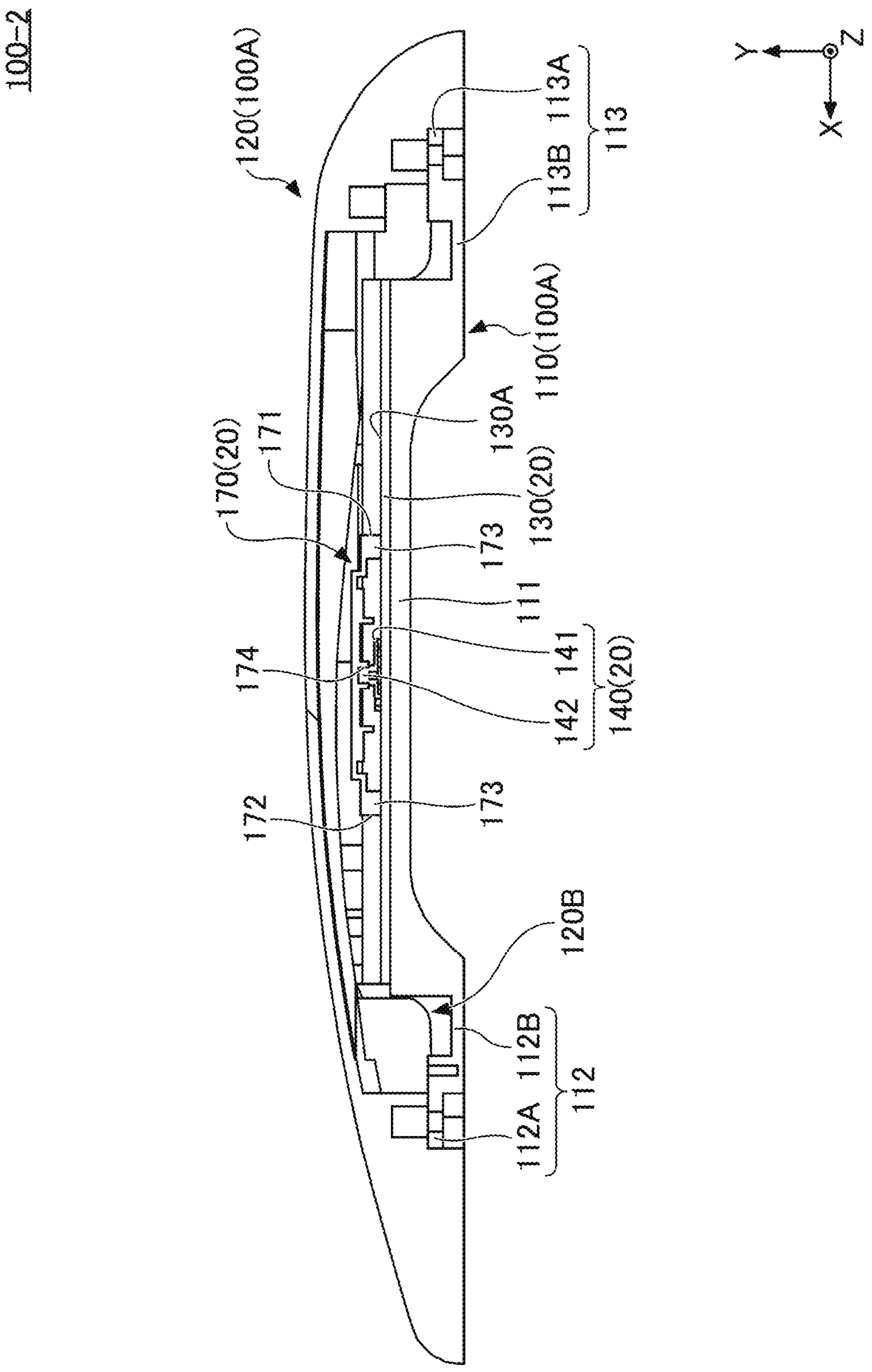
FIG. 15 is a cross-sectional view of the door handle according to the second embodiment.

Second Embodiment (Internal Configuration of a Door Handle 100-2) FIG. 13 and FIG. 14 are an exploded perspective view of the door handle 100-2 according to the second embodiment. FIG. 15 is a cross-sectional view of the door handle 100-2 according to the second embodiment, and illustrates a cross section along the XY plane as viewed from above the door handle 100-2 (positive Z-axis direction).

<Configuration of the Casing 100A>

As illustrated in FIG. 13 to FIG. 15, the door handle 100-2 includes the casing 100A. The casing 100A is similar to the casing 100A included in the door handle 100 according to the first embodiment, and thus description thereof will be omitted.

<Internal Configuration of the Casing 100A>

Also, as illustrated in FIG. 13 to FIG. 15, the door handle 100-2 includes the substrate 130, the strain sensor 140, and the holder 170, in the interior of the casing 100A. The substrate 130, the strain sensor 140, and the holder 170 form a detection device 20.

The substrate 130 and the strain sensor 140 included in the detection device 20 are similar to the substrate 130 and the strain sensor 140 included in the detection device 10 according to the first embodiment. However, in the detection device 20 according to the second embodiment, the fixed portion 141 of the strain sensor 140 is fixed, at the vehicle-outer side-oriented surface 130A of the substrate 130, to the center portion of the substrate 130 in the longitudinal direction (X-axis direction). Also, in the detection device 20 according to the second embodiment, the front-end portion of the shaft 142 of the strain sensor 140 is fitted into a recessed portion 174 formed in a vehicle-inner side-oriented surface of the holder 170.

Also, in the detection device 20 according to the second embodiment, strain occurs in the fixed portion 141 of the strain sensor 140 in response to application of a pressure to the door handle 100-2 because the shaft 142 is compressed toward the vehicle-inner side (negative Y-axis side) by the center portion of the holder 170 displaced to the vehicle-inner side (negative Y-axis side). The surface of the fixed portion 141 on the vehicle-inner side (negative Y-axis side) is provided with the plurality of strain elements (not illustrated). By the plurality of strain elements, the strain sensor 140 can detect strain of the fixed portion 141, i.e., application of a pressure to the door handle 100-2.

The holder 170 is one example of the "displaceable member". The holder 170 is an elastically deformable member formed of a resin and having a flat-plate shape, and extends in the forward-backward direction (X-axis direction) serving as the longitudinal direction. That is, the holder 170 has a longitudinal shape extending along the longitudinal direction of the door handle 100-2. Also, the holder 170 has a shorter length than the length of the substrate 130 in the forward-backward direction (X-axis direction) and is provided to face the center portion of the vehicle-outer side-oriented surface 130A of the substrate 130.

The holder 170 is provided with a pair of leg portions 173 in the upward-downward direction (Z-axis direction) at one end portion 171 that is an end portion backward (negative X-axis side) thereof. By the pair of leg portions 173, the holder 170 is engaged with a pair of upper and lower edge portions backward (negative X-axis side) of the center portion of the substrate 130.

Also, the holder 170 is provided with a pair of leg portions 173 in the upward-downward direction (Z-axis direction) at the other end portion 172 that is an end portion forward (positive X-axis side) thereof. By the pair of leg portions 173, the holder 170 is engaged with a pair of upper and lower edge portions forward (positive X-axis side) of the center portion of the substrate 130.

Each of the plurality of leg portions 173 extends toward the substrate 130 from an upper (positive Z-axis side) lateral surface and a lower (negative Z-axis side) lateral surface of the holder 170. By the substrate 130-oriented surface of the holder 170 contacting the vehicle-outer side-oriented surface 130A of the substrate 130, a relative positional relationship between the leg portions 173 of the holder 170 and the substrate 130 is maintained constant. Each leg portion 173 includes a tip-end portion having a shape folded at the right angle inward of the holder 170 (toward the center of the holder 170 in the Z-axis direction). Edge portions of the substrate 130 are held between the tip-end portions of the leg portions 173 and the substrate 130-oriented surface of the holder 170. Thereby, the leg portions 173 are engaged with the substrate 130 and vertically fixed, thereby holding the edge portions of the holder 170 so as to restrict movements of the holder 170 in the leftward-rightward direction (Y-axis direction) and in the upward-downward direction (Z-axis direction). Note that, each leg portion 173 may be adhesively fixed to the substrate 130, not being limited to engagement.

Also, the center portion of the holder 170 in the forward-backward direction (X-axis direction) is the displaceable portion, and the plurality of leg portions 173 are perpendicular to the substrate 130. Thus, in accordance with deformation (curving) of the substrate 130, portions of the plurality of leg portions 173 on the vehicle-outer side (positive Y-axis side) are tilted outward (in directions away from the center of the holder 170 in the X direction), and the displaceable portion is displaced toward the vehicle-inner side (i.e., in a direction closer to the substrate 130). That is, the center, displaceable portion of the holder 170 is pulled toward both sides in the X-axis direction by the plurality of leg portions 173 that are tilted, thereby maintaining a horizontal state and becoming closer to the vehicle-outer side-oriented surface 130A of the substrate 130.

In this way, in response to application of a pressure to the door handle 100-2, the holder 170 is elastically deformed so as to become closer to the holding portion 111 of the inner casing 110 and the substrate 130.

The recessed portion 174 having a shape recessed toward the vehicle-outer side (positive Y-axis side) is formed at the center portion of the vehicle-inner side-oriented surface of the holder 170 (a position facing the shaft 142 of the strain sensor 140). The recessed portion 174 is one example of an "engaging portion". The front-end portion of the shaft 142 of the strain sensor 140 is fitted into and engaged with the recessed portion 174. Thereby, the door handle 100-2 according to the second embodiment is configured such that, in response to application of a pressure to the door handle 100-2, the center portion of the holder 170 can compress the shaft 142 of the strain sensor 140 toward the vehicle-inner side (negative Y-axis side) in accordance with the displacement of the center portion of the holder 170 toward the vehicle-inner side (negative Y-axis side). Note that, a tip-end surface of the shaft 142 may be configured to contact the center portion of the vehicle-inner side-oriented surface of the holder 170, without providing the recessed portion 174.

(Motions of the Detection Device 20)

Figure 16A:
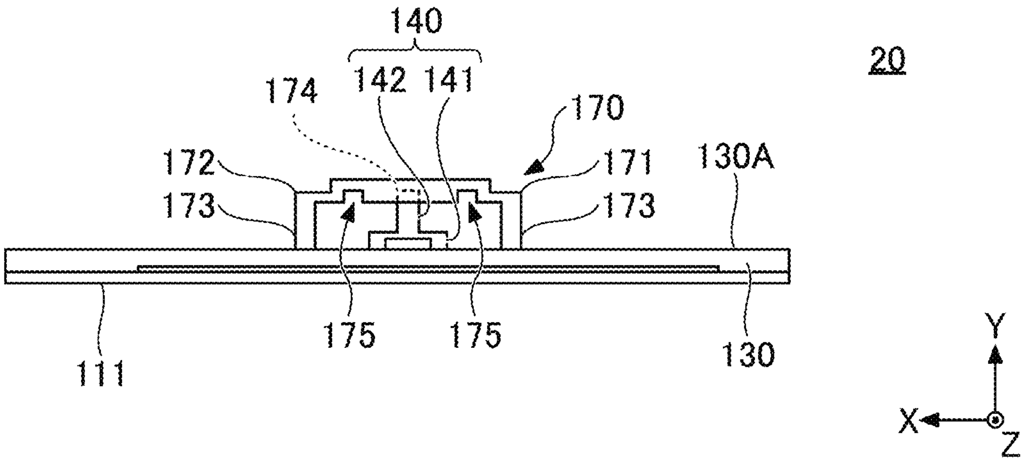
FIG. 16A is a view schematically illustrating motions of a detection device according to the second embodiment.
Figure 16B:
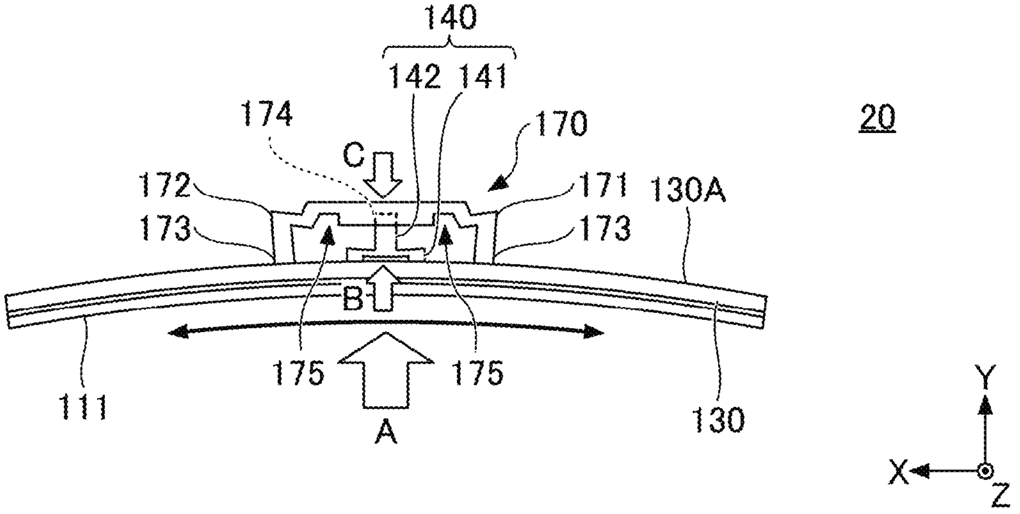
FIG. 16B is a view schematically illustrating the motions of the detection device according to the second embodiment.

FIG. 16A and FIG. 16B are a view schematically illustrating the motions of the detection device 20 according to the second embodiment. The detection device 20 according to the second embodiment can detect the pressure applied by the user's hand to the inner casing 110 by the strain sensor 140.

A specific case thereof will be described. In this case, a pressure is applied by the user's hand to the holding portion 111 of the inner casing 110 of the door handle 100-2 in the vehicle-outer side direction (positive Y-axis direction) (arrow A in FIG. 16B).

Also, as illustrated in FIG. 16A, when no pressure is applied to the holding portion 111, the holder 170 is parallel to the vehicle-outer side-oriented surface 130A of the substrate 130, and each of the plurality of leg portions 173 of the holder 170 is perpendicular to the vehicle-outer side-oriented surface 130A of the substrate 130.

Also, as illustrated in FIG. 16A, the fixed portion 141 of the strain sensor 140 is fixed to the center portion in the vehicle-outer side-oriented surface 130A of the substrate 130. Also, the front-end portion of the shaft 142 of the strain sensor 140 is fitted into the recessed portion 174 provided in the center portion of the vehicle-inner side-oriented surface of the holder 170.

Meanwhile, as illustrated in FIG. 16B, in response to application of a pressure to the holding portion 111 of the inner casing 110, elastic deformation occurs so that the holding portion 111 deflects toward the vehicle-outer side (positive Y-axis side) because both end portions (fixed portions 112 and 113) of the inner casing 110 are fixed to the outer casing 120. At the same time, the substrate 130 fixed to the holding portion 111 is elastically deformed so as to deflect toward the vehicle-outer side (positive Y-axis side) together with the holding portion 111. Thereby, the center portion of the substrate 130 is displaced in a direction closer to the holder 170 (positive Y-axis direction) (arrow B in FIG. 16B). At this time, as described above, the leg portions 173 are tilted so as to maintain a relationship that is perpendicular to the substrate 130. Thus, as illustrated in FIG. 16B, the distance between: the end portions, connected to the substrate 130, of the forward (positive X-axis side) leg portions 173 on the vehicle-outer side (positive Y-axis side); and the end portions, connected to the substrate 130, of the backward (negative X-axis side) leg portions 173 on the vehicle-outer side (positive Y-axis side) becomes longer. As a result, the holder 170 is stretched in the longitudinal direction (X-axis direction) and the holder 170 is elastically deformed toward the vehicle-inner side so as to be flat. Thereby, the center portion of the holder 170 is displaced in a direction closer to the substrate 130 (negative Y-axis direction) (arrow C in FIG. 16B). With the assistance of the elastic deformation caused so that the substrate 130 deflects toward the vehicle-outer side (positive Y-axis side), the center portion of the holder 170 can compress the shaft 142 of the strain sensor 140 toward the vehicle-inner side (negative Y-axis side).

Note that, as illustrated in FIG. 16A and FIG. 16B, a pair of front and back grooves 175, which are cut out into a straight line extending in the upward-downward direction (Z-axis direction), are formed in the vehicle-inner side (negative Y-axis side)-oriented surface of the holder 170. Thereby, the holder 170 has such a shape that is readily stretchable and deformable as described above.

The strain sensor 140 causes strain of the fixed portion 141 by the shaft 142 being compressed. The strain sensor 140 detects the strain of the fixed portion 141 by a plurality of strain elements (not illustrated) and outputs a detection signal representing the strain as a pressure detection signal representing application of a pressure by the user's hand.

The detection device 20 according to the second embodiment is the detection device 20 provided in the interior of the vehicle door handle 100-2 including the inner casing 110. The detection device 20 includes: the substrate 130 that has a longitudinal shape extending along a longitudinal direction of the door handle 100-2, is disposed fixedly to the inner casing 110, and is configured to deform in response to a pressure applied to the inner casing 110; the holder 170 that has a longitudinal shape extending along the longitudinal direction of the door handle 100-2 and is provided to face the substrate 130, in which both of the one end portion 171 and the other end portion 172 are connected to the substrate 130, and that includes a displaceable portion configured to be displaced relatively to the substrate 130 in accordance with deformation of the substrate 130; and the strain sensor 140 configured to detect displacement of the displaceable portion.

Thereby, the detection device 20 according to the second embodiment can deform the substrate 130 and the holder 170 together with the inner casing 110 in response to application of a pressure to the inner casing 110, and displace the displaceable portion of the holder 170 relatively to the substrate 130. Therefore, the detection device 20 according to the second embodiment detects displacement of the displaceable portion of the holder 170 by the strain sensor 140 at a single site thereof, and can more reliably detect the pressure applied to the inner surface of the door handle 100-2 in a relatively simple configuration.

In the detection device 20 according to the second embodiment, both of the one end portion 171 and the other end portion 172 of the holder 170 are connected to the substrate 130, the center portion between the one end portion 171 and the other end portion 172 is the displaceable portion, and the displaceable portion is displaced in a direction closer to the substrate 130.

Thereby, the detection device 20 according to the second embodiment detects the displacement of the center portion of the holder 170 in the direction closer to the substrate 130 in response to application of a pressure to the inner casing 110, and can more reliably detect the pressure applied to the inner surface of the door handle 100-2 in a relatively simple configuration.

Also, the strain sensor 140 in the detection device 20 according to the second embodiment is the strain sensor 140 configured to detect strain occurring in accordance with the displacement of the displaceable portion in the direction closer to the substrate 130.

Thereby, the detection device 20 according to the second embodiment causes strain in the strain sensor 140, and can more reliably detect the displacement of the center portion of the holder 170 in the direction closer to the substrate 130.

Also, the strain sensor 140 in the detection device 20 according to the second embodiment includes the fixed portion 141 disposed fixedly to the substrate 130 and the shaft 142 projecting from the fixed portion 141 toward the holder 170, and the shaft 142 is engaged with an engaging portion provided in the displaceable portion.

Thereby, the detection device 20 according to the second embodiment causes strain in the strain sensor 140 by the shaft 142 being compressed, and can more reliably detect the displacement of the center portion of the holder 170 in the direction closer to the substrate 130. Note that, in the present example, the grooves 175 are provided, and also the center, upper surface of the holder 170 has a shape projecting toward the positive Y-axis side compared to the upper ends of the leg portions 173 (hereinafter this shape is referred to as a "projecting shape"). Thus, when the upper ends of the leg portions 173 are extended, a force to stretch in the X-axis direction is applied to a portion connecting the upper ends of the leg portions 173 to each other. Therefore, the center, upper surface of the holder 170 is displaced toward the negative Y-axis side. However, the grooves 175 and the above projecting shape are not essential configurations. For example, the portion connecting the upper ends of the leg portions 173 of the holder 170 may be made thin so as to elastically deform in the X-axis direction. In this case, the shaft 142 is compressed toward the vehicle-inner side (negative Y-axis side) by deformation of the substrate 130 toward the vehicle-outer side (positive Y-axis side), and thus it is possible to detect the pressure applied to the inner casing 110.

(One Modified Example of the Detection Device 20)

Figure 17A:
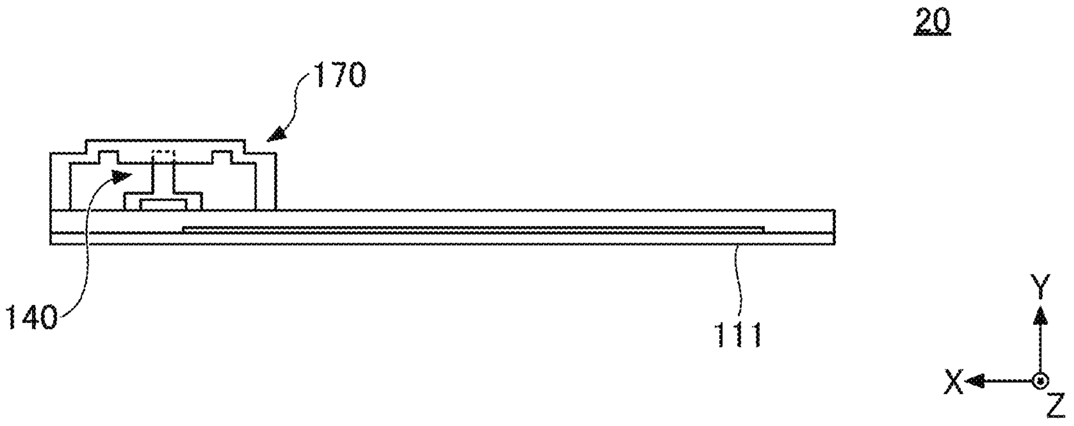
FIG. 17A is a view schematically illustrating one modified example of the detection device according to the second embodiment.
Figure 17B:
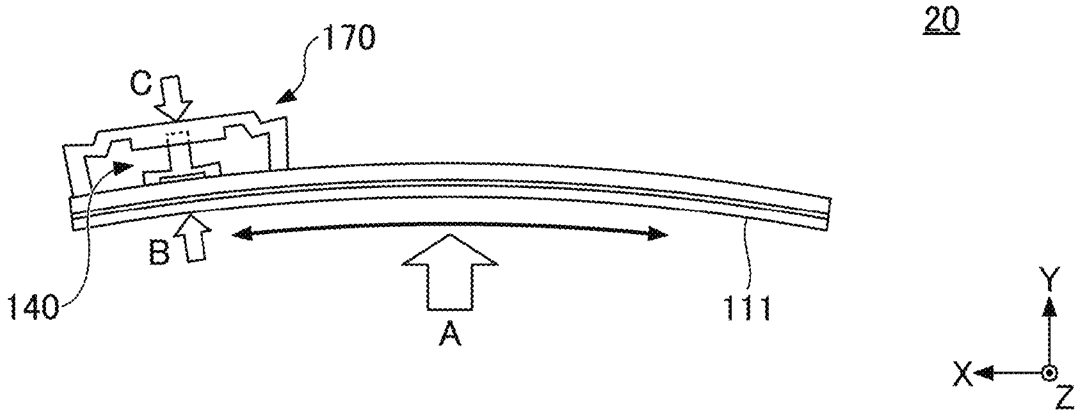
FIG. 17B is a view schematically illustrating one modified example of the detection device according to the second embodiment.

FIG. 17A and FIG. 17B are a view schematically illustrating one modified example of the detection device 20 according to the second embodiment. As illustrated in FIG. 17A and FIG. 17B, the detection device 20 according to the second embodiment may include the holder 170 and the strain sensor 140 that are disposed at an end portion of the substrate 130 in the longitudinal direction (X-axis direction) instead of including the holder 170 and the strain sensor 140 at the center portion of the substrate 130 in the longitudinal direction (X-axis direction). In the example as illustrated in FIG. 17A and FIG. 17B, the holder 170 and the strain sensor 140 are disposed at the front-end portion (the end portion on the positive X-axis side) of the substrate 130.

As illustrated in FIG. 17A and FIG. 17B, the substrate 130 in the door handle 100-2 according to the second embodiment is entirely curved in response to application of a pressure to the inner casing 110. Therefore, regardless of a position in the longitudinal direction of the substrate 130 at which the holder 170 and the strain sensor 140 are disposed, the holder 170 can be similarly deformed, and the shaft 142 of the strain sensor 140 can be compressed by the center portion of the holder 170.

For example, as illustrated in FIG. 17B, in response to application of a pressure to the holding portion 111 of the inner casing 110 (arrow A in FIG. 17B), the holding portion 111 and the substrate 130 are elastically deformed so as to deflect toward the vehicle-outer side (positive Y-axis side). Thereby, a disposition portion of the strain sensor 140 in the substrate 130 is displaced in a direction closer to the holder 170 (positive Y-axis direction) (arrow B in FIG. 17B). At this time, as illustrated in FIG. 17B, the holder 170 is stretched in the longitudinal direction (X-axis direction) and the holder 170 is elastically deformed toward the vehicle-inner side. Thereby, the center portion of the holder 170 is displaced in a direction closer to the substrate 130 (negative Y-axis direction) (arrow C in FIG. 17B). As a result, the center portion of the holder 170 can compress the shaft 142 of the strain sensor 140 toward the vehicle-inner side (negative Y-axis side).

According to one embodiment, it is possible to more reliably detect the pressure applied to an inner surface of the door handle in a relatively simple configuration.

In the above, one embodiment of the present disclosure has been described in detail. However, the present disclosure should not be construed as being limited to the above-described embodiment. Various modifications or changes are possible in the scope of the gist of the present disclosure that is recited in claims.

What is claimed is:

1. A detection device, which is provided in an interior of a vehicle door handle including an inner casing, the detection device comprising:

a base portion having a longitudinal shape extending along a longitudinal direction of the door handle, the base portion being disposed fixedly to the inner casing, and the base portion being configured to deform in response to application of a pressure to the inner casing;

a displaceable member having a longitudinal shape extending along the longitudinal direction of the door handle, the displaceable member being provided to face the base portion, one end portion of the displaceable member in a longitudinal direction of the displaceable member being connected to the base portion, and the displaceable member including a displaceable portion configured to be displaced relatively to the base portion in accordance with deformation of the base portion; and a sensor configured to detect displacement caused by deformation of the displaceable portion in the longitudinal direction of the door handle relative to the base portion, wherein the one end portion of the displaceable member is connected to the base portion, and the other end portion thereof is the displaceable portion, and the displaceable portion is displaced in the longitudinal direction of the door handle relative to the base portion, wherein the sensor is a strain sensor configured to detect strain occurring in accordance with the displacement of the displaceable portion in the longitudinal direction of the door handle, and wherein the longitudinal direction is orthogonal to a direction of the pressure applied to the inner casing.

2. The detection device according to claim 1, wherein the displaceable member includes a plurality of leg portions extending toward the base portion, the plurality of leg portions being configured to retain edge portions of the base portion.

3. The detection device according to claim 2, wherein the displaceable member includes a plurality of leg portions extending toward the base portion, the plurality of leg portions retaining edge portions of the base portion so as to allow the displaceable member to move relative to the base portion in the longitudinal direction and restrict movements of the displaceable member in a width direction and a height direction.

4. The detection device according to claim 1, wherein the sensor includes a fixed portion disposed fixedly to the base portion, and a shaft projecting from the fixed portion toward the displaceable member, and the shaft is engaged with an engaging portion provided in the displaceable portion.

5. The detection device according to claim 1, wherein the sensor includes a fixed portion disposed fixedly to the base portion, and a shaft projecting from the fixed portion toward the displaceable member, and the shaft is engaged with an engaging portion provided in the displaceable portion.

6. The detection device according to claim 1, wherein the vehicle door handle further includes an outer casing provided on a vehicle-outer side, and the inner casing is provided on a vehicle-inner side, the outer casing and the inner casing being combined with each other to form a casing in which the detection device is provided.

7. A detection device, which is provided in an interior of a vehicle door handle including an inner casing, the detection device comprising:

a base portion having a longitudinal shape extending along a longitudinal direction of the door handle, the base portion being disposed fixedly to the inner casing, the base portion being configured to deform in response to application of a pressure to the inner casing;

a displaceable member having a longitudinal shape extending along the longitudinal direction of the door handle, the displaceable member being provided to face the base portion, either or both of one end portion and the other end portion of the displaceable member in a longitudinal direction of the displaceable member being connected to the base portion, the displaceable member including a displaceable portion configured to be displaced relatively to the base portion in accordance with deformation of the base portion; and a sensor configured to detect displacement caused by deformation of the displaceable portion in the longitudinal direction of the door handle relative to the base portion, wherein both of the one end portion and the other end portion of the displaceable member are connected to the base portion via leg portions, a center portion between the one end portion and the other end portion is the displaceable portion, and the displaceable portion is displaced in a direction closer to the base portion by portions of the leg portions on a vehicle-outer side being tilted outward in accordance with the deformation of the base portion, wherein the sensor is a strain sensor configured to detect strain occurring in accordance with the displacement of the displaceable portion in the direction closer to the base portion, and wherein the longitudinal direction is orthogonal to a direction of the pressure applied to the inner casing.

8. The detection device according to claim 7, wherein the displaceable portion is displaced in the direction closer to the base portion by the portions of the leg portions on the vehicle-outer side being tilted outward in accordance with the deformation of the base portion, the displaceable member being stretched in the longitudinal direction of the displaceable member, and the displaceable member being elastically deformed toward a vehicle-inner side so as to be flat.

* * * * *